US009023214B2

(12) United States Patent
Zolezzi-Garreton

(10) Patent No.: US 9,023,214 B2
(45) Date of Patent: May 5, 2015

(54) METHOD AND APPARATUS FOR APPLYING PLASMA PARTICLES TO A LIQUID AND USE FOR DISINFECTING WATER

(75) Inventor: Alfredo Zolezzi-Garreton, Vina del Mar (CL)

(73) Assignee: AIC, LLC, Dover, DE (US)

(*) Notice: Subject to any disclaimer, the term of this patent is extended or adjusted under 35 U.S.C. 154(b) by 1068 days.

(21) Appl. No.: 13/021,707

(22) Filed: Feb. 4, 2011

(65) Prior Publication Data

US 2011/0240567 A1 Oct. 6, 2011

Related U.S. Application Data

(60) Provisional application No. 61/303,267, filed on Feb. 10, 2010.

(51) Int. Cl.
*C02F 1/48* (2006.01)
*B01J 19/08* (2006.01)
*C02F 1/46* (2006.01)
*C02F 1/02* (2006.01)
*C02F 1/30* (2006.01)

(52) U.S. Cl.
CPC ................. *C02F 1/4608* (2013.01); *C02F 1/02* (2013.01); *C02F 1/302* (2013.01); *C02F 2209/02* (2013.01); *C02F 2209/03* (2013.01)

(58) Field of Classification Search
CPC ............... C07C 1/00; C07C 1/04; C02F 1/48; B01J 19/08
USPC ............. 585/324, 329, 326; 210/748.01, 153, 210/600, 243, 294, 322, 748.17; 588/300, 588/301, 311, 312; 422/186.29; 204/155, 204/156, 157.3, 164, 168, 169, 554, 193, 204/194
See application file for complete search history.

(56) References Cited

U.S. PATENT DOCUMENTS

| | | | | |
|---|---|---|---|---|
| 5,541,386 | A * | 7/1996 | Alvi et al. | 219/121.38 |
| 2002/0103405 | A1* | 8/2002 | Hatanaka | 585/324 |

* cited by examiner

*Primary Examiner* — Walter D Griffin
*Assistant Examiner* — Cameron J Allen
(74) *Attorney, Agent, or Firm* — Karim Lagobi

(57) ABSTRACT

The invention provides a method and apparatus for creating plasma particles and applying the plasma particles to a liquid. Liquid feedstock (e.g., water and/or hydrocarbons mixed with biomass) is pumped through a pipeline; the single-phase stream is then transformed into a biphasic liquid-and-gas stream inside a chamber. The transformation is achieved by transitioning the stream from a high pressure zone to a lower-pressure zone. The pressure drop may occur when the stream further passes through a device for atomizing liquid. Inside the chamber, an electric field is generated with an intensity level that exceeds the threshold of breakdown voltage of the biphasic medium leading to a generation of a plasma state. Furthermore, the invention provides an energy-efficient highly adaptable and versatile method and apparatus for sanitizing water using plasma particles to inactivate biological agents contaminating water.

5 Claims, 9 Drawing Sheets

METHOD AND APPARATUS FOR APPLYING PLASMA PARTICLES TO A LIQUID AND USE FOR DISINFECTING WATER

FIELD OF THE INVENTION

The invention relates to a method of generating plasma in a mixture of liquid and gas, and an apparatus therefor. More specifically the invention provides a method and apparatus for generating plasma and applying plasma particles to liquid droplets suspended in a gaseous environment in order to promote a variety of the chemical and physical interactions.

BACKGROUND OF THE INVENTION

Plasma is a state of matter, where matter particles can be free flowing in an ionic form under high-energy conditions. Plasma state can be artificially initiated by discharging a large amount of electric energy confined in a small space.

Several industrial applications that require localized application of high energy utilize plasma. For example, arc discharge in aqueous electrolytes, such as for welding under seawater, is widely used in engineering and construction.

Given the substantial amount of energy that can be utilized with plasma, and the level of spatial control of such application, the number of industrial applications of using plasma that can be contemplated is substantial. However, at present the only known form of stationary plasma discharge in liquid media is the arc discharge in liquid water.

In recent years, electric arc discharge in water has been used in several physico-chemical studies and in the synthesis of various materials. The specific feature of arc discharge in liquid media is the localization of a plasma region near the electrode ends and a "falling" form of volt-ampere characteristic.

The prior art offers several examples of attempts to generate plasma within a liquid. In the US there are a number of patents and published patent applications that describe methods and apparatuses for the initiation of plasma discharges within a liquid phase, where gas, phase-like bubbles are present, and for the use of this discharge for stimulation of chemical processes such as the decomposition of compounds and cracking of materials, which may be used in detoxification, for example.

In U.S. Pat. No. 7,067,204 to Nomura et al. (2006), "Submerged plasma generator, method of generating plasma in liquid and method of decomposing toxic substance with plasma in liquid" is proposed. A method and apparatus for generating plasma in a liquid is described. The apparatus includes an ultrasonic wave generator for generating bubbles in the liquid, and an electromagnetic wave generator for continuously irradiating electromagnetic waves into the liquid from within the liquid in order to generate plasma. The method of generating plasma in a liquid includes the steps of generating bubbles in the liquid by irradiating ultrasonic waves in the liquid, and generating plasma in the bubbles by continuously irradiating electromagnetic waves from within the liquid to the bubbles. This invention comprises various methods for generating the bubbles inside the liquid medium, such as a heating device, a decompression device or an ultrasonic wave generator. The gas-liquid ratio achieved by the latter described bubble generating method is small. Basically, the liquid phase prevails in the medium. Therefore, the steady burning zone of the discharge is quite small, resulting in a very small field of applications for the device.

In U.S. Pat. No. 5,270,515 to Long and Raymond (1993), "Microwave plasma detoxification reactor and process for hazardous wastes" is proposed. A large volume microwave plasma process for "in-situ" detoxification of dioxins, furans and other toxicants is disclosed. A helical coil and a cylinder of low loss dielectric tubing are coaxially positioned inside a microwave resonant cavity to extend from a cross-polarized fluid inlet to a cross-polarized vapor outlet. Fluid passing through the coil cylinder is directly ionized to the plasma state by microwave energy introduced into the cavity. The geometry of the coil relative to the cylinder induces a magnetic field in the plasma compressing the plasma to the center of the cylinder, thereby preventing charring of the cylinder walls. Said geometry also provides a slower fall through rate for the treatment of liquid and solid waste. The process and apparatus are particularly suitable for mobile applications, for on-site treatment of hazardous wastes. In the latter apparatus, a liquid medium is treated by the microwave irradiation for ionization. However, the latter method requires complicated equipment and high energy microwave irradiation and can be applied only for a restricted range of liquids. In the latter invention microwaves are used to ionize the fluid passing through the coil cylinder for producing plasma, which consumes large amounts of energy.

In U.S. Pat. No. 4,886,001 to Chang et al. "Method and apparatus for plasma pyrolyisis of liquid waste", a method and apparatus for pyrolytically decomposing waste material is disclosed. The method is characterized by injecting a mixture of waste and water into a plasma torch having an operation temperature over 5000° C. to form a mixture of product gases and solid particulate. The gases and particulate are separated in a cyclone separator. A second cyclone separator and a partial vacuum separate any carryover gases from the particulate. The carryover gases and the particulate are treated in a scrubber with a caustic solution and water in order to eliminate any carryover particulate from the gases, and to neutralize hydrochloric acid (HCl) present in the gases. Finally the gases are removed from the scrubber. In the latter apparatus, plasma is only used as a high temperature source, used for decomposition of substances.

In US Patent Application 2004/0265137 A1, December 2004, and U.S. Pat. No. 7,384,619, "Method for generating hydrogen from water or steam in plasma", both to Bar-Gadda a method is proposed for hydrogen production from water or steam by means of plasma discharge excited in the Ultra-high radio frequency or low radio frequency, as well as with arc discharge. Bar-Gadda describes the injection of water molecules into plasma discharge in the form of steam, which is usually produced by water boilers, therefore reducing the efficiency of the overall process.

In U.S. Pat. No. 7,070,634 B1 A1, April 2006, "Plasma reformer for hydrogen production from water and fuel" to Wang describes a plasma apparatus for converting a gaseous mixture of water vapor and hydrocarbons into hydrogen. The reaction chamber consists of an outer wall that acts as an emitter electrode and an inner wall that acts as a collector electrode. The mixture of water vapor and hydrocarbons are introduced between these two layers, inside a non-equilibrium thermal plasma environment. A non-combustion pyrolysis process is used to create this environment.

In Japanese Application JP2006273707 by Shibata et al., relates to the publication "Synthesis of amorphous carbon nanoparticles and carbon-encapsulated metal nanoparticles in liquid benzene by an electric plasma discharge in ultrasonic cavitation field", Ultrasonic Sonochemistry 13 (2006) 6-12, Institute of Multidisciplinary Research for Advanced Material (IMRAM), Tohoku University. This application illustrates a method and a device for producing a nanocarbon material, which does not require an expensive production facility such as the ones normally required for dry treatment. It can easily produce the nanocarbon material because the application of high voltage is not needed, neither worsening nor deteriorating the working environment in a production premise, and at the same time considering the safety. This method can remarkably reduce production costs by improving production efficiency because of its continuous production and recovery, and providing an alternative for mass productivity. The method comprises a process (A) for arranging electrodes, one cathode and one anode, connected to a power source; an ultrasonic horn connected to an ultrasonic generator within an organic solvent that fills a container; and a process (B) for generating an ultrasonic cavitation field by ultrasonic waves into the organic solvent, around the head of the ultrasonic horn; and effecting the thermal decomposition of the molecules in the organic solvent by applying a voltage to the electrodes so as to generate plasma discharge within the ultrasonic cavitation field adequate for the production of the nanocarbon material.

U.S. Pat. No. 6,835,523, by Yamasaki et al., describes a "Method for fabricating with ultrasonic vibration a carbon coating", which is a process for fabricating a carbon coating in a medium disposed on one side of an electrode connected to a high-frequency power supply. Ultrasonic vibrations are then supplied to the object.

Prior art (cited above) lacks control of a continuous operation, and require large amounts of power, which can be industrially infeasible. Therefore, given the substantial expected benefits of using plasma to induce chemical reactions to both break down compounds and synthesize new ones, there's a need for methods and apparatuses that provide continuous operation at a cost-effective level and modularity for scalable industrial applications.

SUMMARY OF THE INVENTION

The invention provides a method and apparatus for generating plasma and applying plasma particles to a liquid. The method of applying plasma particles to a liquid, according to the invention, relies on the basic concept of transforming a liquid into a mixture of liquid droplets suspended in a gas phase, and igniting a plasma state in the gas phase. Plasma particles are able to diffuse through the droplets of liquid. The droplets of liquid may have a diameter of a few tens micrometers (or even less), thereby given the small size of the liquid droplets and the large ratio between gas and liquid phases, the diffusion process is highly efficient and requires a short amount of time.

The next stage typically comprises reversing the mixture back into a liquid phase. However, because the product of the one or more reactions taking place in the presence of plasma may comprise one or more gases, solid particles or any other byproduct, one or more means of separation of the products may be implemented.

The method according to implementations of the invention involves transforming a single-phased stream into a biphasic liquid-and-gas or liquid-and-vapor stream, which may be achieved by transitioning the stream from a high pressure zone (e.g., inside a pipeline) into a lower pressure zone (e.g., plasma chamber). Additionally, the transitioning may be carried out through a diaphragm, an ultrasonic hydrodynamic transducer or any other means capable of atomizing a liquid.

The method involves igniting a plasma state inside the mixture. The latter is typically conducted by creating an electric field with a level that exceeds the threshold of breakdown voltage of the biphasic medium inside the low pressure zone and through the stream of the biphasic medium.

The energy consumption rate is considerably lower compared with prior art for igniting and sustaining plasma in order to apply plasma particles to a liquid. The high efficiency of the process, according to the invention, gives implementations of the invention the flexibility, scalability and therefore modularity, all features that facilitate industrial implementation for mass-production.

The reaction is typically carried out in a reactor that has a nozzle to atomize the liquid at the ingress, and a back pressure system at the egress. The biphasic stream, in which the discharge is produced, has a dynamic cluster structure with a large interface between the gas and liquid phases (i.e. liquid droplets in a gas-phase stream). By varying the pressure in the input of the nozzle and counter pressure in the outlet pipeline, it is possible to change the ratio of gas and liquid phases in the stream, and the regime of steady burning of the discharge and, hence, the direction and velocity of the chemical reactions produced in the plasma chamber.

An apparatus according to the invention may be utilized in a variety of systems for carrying out several applications. The disclosure describes an application for disinfecting a water supply using application of plasma particles. In many situations of emergency, such as in the aftermath of a hurricane, a monsoon, an earth quake, a flood, a terrorist attack, a war or any other affection of the kind, the water supply may become contaminated with harmful biological agents. In these cases a water sanitation system could be installed on location to disinfect the water. The locations may include housing buildings, factories, hospitals or any type of building that may be, for example, a target of a terrorist attack involving hazardous biological agents. A water sanitization system embodying the invention may be placed after the water matrix and inside each building's dependencies to provide water disinfection.

The various ionic particles created in the plasma, newly synthesized molecules (e.g. Ozone), and molecules resulting from the breakdown of larger molecules may be efficient at inactivating biological agents contaminating a water stream. A water sanitization apparatus implementing the invention, is highly adaptable and versatile. For instance, a plurality of apparatuses may be combined to increase the sanitization throughput. Also, the possibility of controlling the input parameters enable a user of the apparatus to govern the generation of each of the effects over the water (i.e. UV, IR, ozone, frequency of elastic waves), so as to optimize the disinfection process. In addition, because of the low energy requirement to operate, an apparatus may be adapted to be powered by solar energy. Thus, providing a system that can be deployed in remote area where necessary.

Furthermore, the treated water may be recirculated within the same device and/or several devices (e.g., mounted in series) in order to assure a high level of disinfection. For example, since the feedstock may contain several contaminants, each of which may require a specific treatment, a re-circulation stage may be necessary to rid the water of particular contaminant.

DETAILED DESCRIPTION OF THE INVENTION

Figure 1:
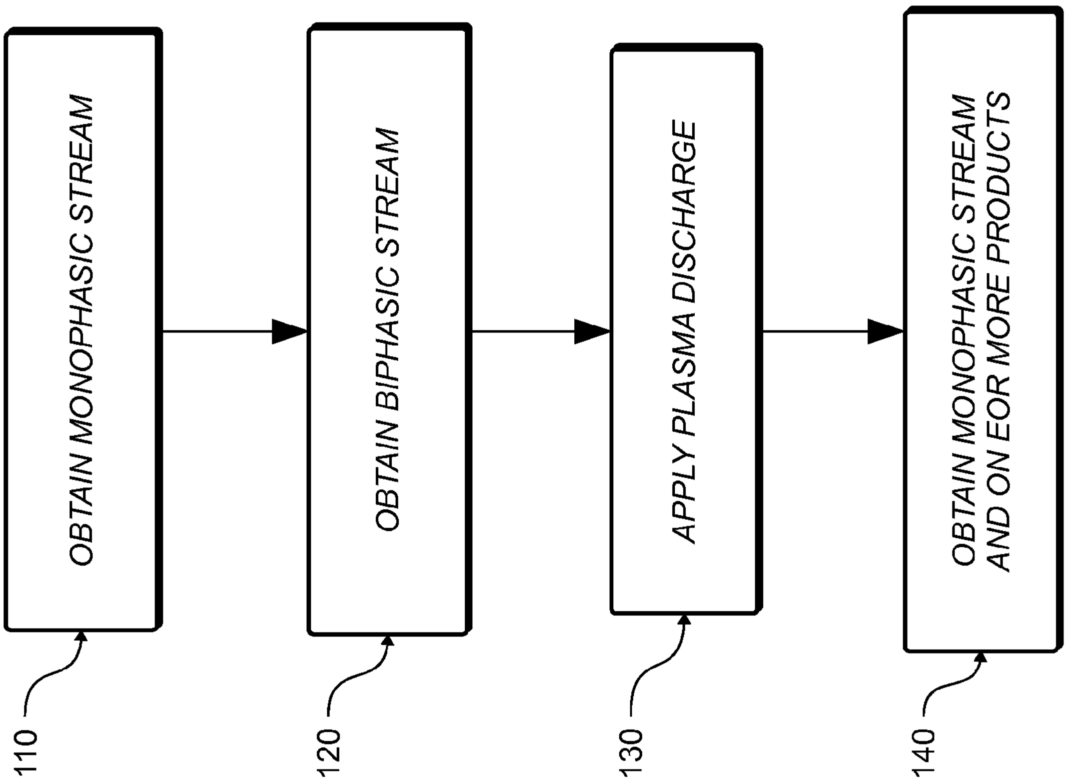
FIG. 1 is a flowchart diagram that represents the overall steps for creating a plasma state in a biphasic medium, in accordance with an embodiment of the invention.

The invention provides a method and apparatus for applying plasma to a liquid. The invention provides creating high electrical conductivity in a gas, which is conducive to initiating and sustaining plasma state, using substantially lower energy requirements compared with the teaching of prior art. Embodiments of the invention achieve the latter by efficiently producing a biphasic medium of liquid droplets suspended in a gas. The invention provides means for controlling the size of the droplets, the ratio of liquid to gas, as well as the intensity of the plasma, its localization and numerous other parameters that would allow one with ordinary skills in the art to apply the invention to a variety of applications.

In the following description, numerous specific details are set forth to provide a more thorough description of the invention. It will be apparent, however, to one skilled in the pertinent art, that the invention may be practiced without these specific details. In other instances, well known features have not been described in detail so as not to obscure the invention. The claims following this description are what define the metes and bounds of the invention.

The disclosure describes among other exemplary applications, an embodiment of the invention where a system implementing the invention is able to rid water that is known to (or may potentially) be infected with biological agents. One with ordinary skills in the pertinent art would recognize that numerous systems and methods may be designed following the teachings of the invention to carry out many different applications without departing from the spirit and scope of the invention.

Terminology

In the present disclosure a reference to "gas" may be used sometimes to refer the state of matter in which a substance is found in its usual form (e.g., Air), but at other times, it may be used to refer to a substance that has momentarily acquired some or all gas properties (e.g., vapor). Similarly, a reference to a liquid may be used to refer to a substance usually found in its liquid form, and/or that has momentarily formed a liquid (e.g., a condensate), or combined with other substances (e.g., through dilution) and momentarily formed a liquid. These states, and/or state transition may be very beneficial to embodiments of the invention, in order, for example, to use a transitional state to separate a given substance from a mixture.

General Concept

Under usual conditions, the concentration of charge carriers (electrons and ions) in a gas is very low: a gas is a very good dielectric. A gas requires the presence of a high quantity of charge carriers, which can be created through ionization, in order to acquire any significant electrical conductivity. A gas acquires a steady electric conductivity once there is an equilibrium between the origination and disappearance of charges.

The most common method to artificially create plasma is through creating an electric arc between a pair of electrodes under high-voltage. In a gas, the discharge voltage has to reach a given level i.e. breakdown voltage, in order to ionize gas particles. The plasma state may then be maintained through the passage of a sustained electric current though the plasma.

The appearance or threshold of discharges in the gas phase depends considerably on the pressure of the gas. Thus, in the case of a uniform field of breakdown voltage (self-maintained discharge initiation voltage) the threshold is determined by the product of pressure by the distance between the electrodes, according to Paschen's Law. Paschen determined that breakdown voltage is determined by the following equation:

$$V = \frac{a(pd)}{\ln(pd) + b}$$

where "V" is the breakdown voltage in Volts, "p" is the pressure in atmospheres, "d" is the gap distance in meters, and "a" and "b" are constants characterizing the particular gas between the electrodes. Thus, in contrast to liquids, which are relatively incompressible, different forms of electric discharge can be implemented in gases by varying the pressure of the gas between the electrodes.

In a gaseous phase, different kinds of discharges to produce plasma may be implemented, the external manifestation and electrical parameters of which are connected with a wide range of technical characteristics for devices used in each implementation and a variety of elementary processes determining the conditions of current passage through a gas.

The method, in accordance with the invention, transitions a liquid from a very high pressure zone to a lower pressure zone. The liquid thus expands in a sort of "evaporation" (or gasification) phenomenon. In addition, to the latter intrinsic behavior, the gasification of the liquid may be aided in embodiments of the invention by one or more means for atomizing the liquid. For example, a system implementing the invention may utilize a nozzle, a diaphragm, a hydrodynamic transducer or any other means capable of producing droplets of liquid. As a result of the transition, the liquid's phase composition and physical properties abruptly change from liquid-only to a biphasic state of liquid and gas. The latter state facilitates the creation of electric discharges within the mixture of liquid and gas.

In embodiments of the invention, as the ratio of gas-to-liquid increases it creates the conditions that facilitate electric breakdown when a plasma state creation is desired.

FIG. 1 is a flowchart diagram that represents the overall steps for creating a plasma state in a biphasic medium, in accordance with an embodiment of the invention. At step 110, a system embodying the invention obtains a liquid mixture, feedstock. The feedstock may comprise any number and type of liquids, optionally mixed with one or more diluted, suspended and/or emulsified substances. The composition of the feedstock may be selected by a user for any specific application using an embodiment of the invention. The feedstock may contain water, electrolytes and any other substance (e.g., oils) that may be targeted for breakdown, synthesis or promotion (e.g., catalysis) in a reaction in accordance with an application of the invention.

At step 120, a system embodying the invention passes the feedstock though a device that transitions the feedstock from a liquid phase into a biphasic state containing liquid and gas. The latter may be achieved, by passing the liquid through a nozzle, a diaphragm, a hydrodynamic transducer or any other means capable of producing droplets, such as a spray, of liquid.

For each feedstock, the parameters and means of transitioning the liquid into the biphasic state may be adjusted. For example, the size of the opening of a nozzle, and many other parameters, such as pressure, the hydrodynamic transducer adjustments, or any other parameter, may be adjusted according to the density and/or composition of the feedstock, or any other requirement of a given application for which an embodiment of the invention is used.

In an implementation of the invention, the transition of the feedstock from a liquid to liquid-and-gas state may be designed to occur at the passage into a reactor. The reactor (see below for a more detailed description) typically comprises a vessel with electrodes for initiating and sustaining plasma.

At step 130, the feedstock is passed through a reaction chamber, to which it is simply referred as a reactor, where plasma is initiated and sustained. The presence of the plasma particles, the temperature, the pressure, the feedstock composition determine the type of the chemical reactions to take place in the reactor. Plasma state increases the local temperature and pressure and generates other effects such as luminescence, infra-red (IR) radiation and ultraviolet (UV) radiation. Chemical bond breakage and liberation of radicals may follow. For example, if the fluid were water, plasma state would generate ozone and OH radicals, bearing an extremely reactive and oxidative atmosphere, which has important effects on the fluid.

In the reaction chamber, a stable and stationary electric plasma discharge may be realized. These stable characteristics can be measured for each medium, thus making it possible to optimize the burning parameters by collecting data and adjusting the parameters in order to fulfill specific technological tasks, according to the desired application. Given the stability of the burning characteristics, the invention allows one to easily adjust the requirements or power.

At step 130, other steps for separating by products of the reaction may be undertaken in embodiments of the invention.

At step 140, the stream of liquid-and-gas feedstock is converted back to a liquid state. However, since other solid and/or gas compounds may result from the reaction that takes place in the reactor, those compounds may be separated thought other means (see below) that do not require a conversion to a liquid phase.

Figure 2:
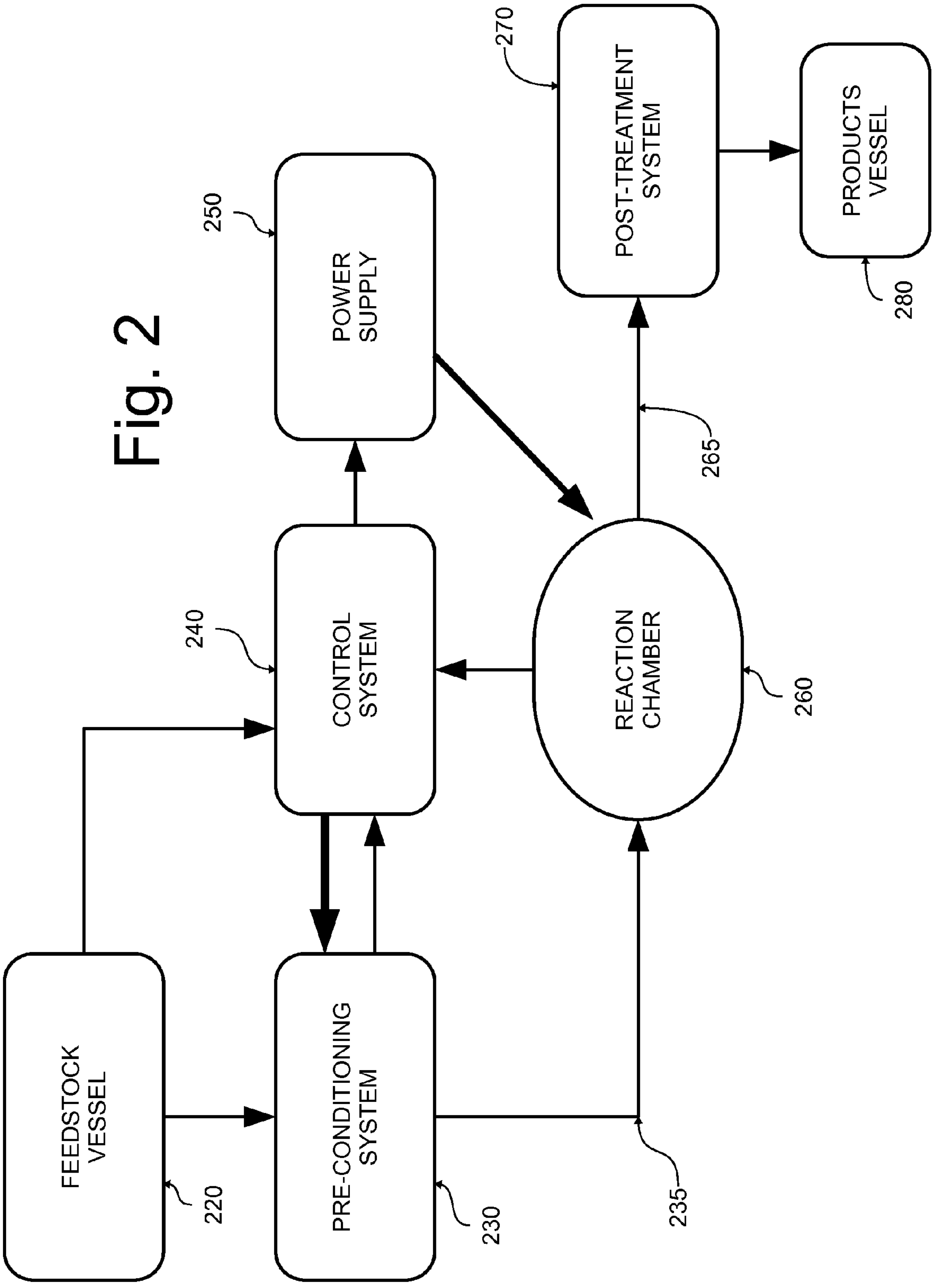
FIG. 2 is a block diagram representing the basic components of a system implementing the invention for applying plasma to a liquid.

FIG. 2 is a block diagram representing the basic components of a system implementing the invention for applying plasma to a liquid. Block 220 represents one or more feedstock sources (to which it is also referred as feedstock vessel), that may be a tank for storing feedstock and/or preparing a mixture of feedstock. In addition, block 220 may represent a pipeline for continuous feed of feedstock. Feedstock vessel 220 feeds a pre-conditioning system represented by block 230. Feedstock may be transferred from the feedstock source 220 to the pre-conditioning system using pumps, pipelines and any other device required to transport feedstock.

Block 230 represents one or more pre-conditioning systems that may comprise a heater, a cooling system, a vacuum and/or a compressing device and any other system that may be beneficial to treating the feedstock before treating the liquid with plasma in accordance with embodiments of the invention. An apparatus implementing the invention may easily change the operation parameters such as temperature, pressure, density, and concentration among others, because of the high versatility that the pre-conditioning system provides. The ability of the pre-conditioning system to be configured in many ways enables an embodiment of the invention to provide optimal set of parameters to initiate and maintain a stable plasma discharge for each desired outcome of the application of plasma to the feedstock and/or type of feedstock.

Block 240 represents a data collection, processing and control system. Any of the components of a system embodying the invention may be configured to collect and transmit data to the control system. For example, environment parameters, such as temperature and pressure, may be measured at any stage of operation, and the data collected and processed. Furthermore, the control system may be configured to control any device of the system and use the feedback data to optimize operations. For example, the control system may control the pumps in order to increase or decrease the pressure inside a reactor, in order to optimize the pressure level required by a given chemical reaction, and the flow rate through the reactor, the pre-conditioning system, the post-conditioning system or any other component of a system embodying the invention.

The pressured stream flows through the pre-conditioning system 230 through a high pressure pipeline 235 into a reactor 260. By design, the size of reactor 260 may be setup, such as the entry of the liquid causes the liquid to expand inside the reactor.

The pressured stream flows through the pre-conditioning system 230 through a high pressure pipeline 235 into a reactor 260. By design, the size of reactor 260 may be setup, such that the entry of the liquid causes the liquid to expand inside the reactor.

In an embodiment of the invention, the plasma chamber 260 is made from a dielectric material and comprises two parts between which there is a metal sealing plug to carry out the role of a discharge electrode. The second electrode may be connected to the pipeline armature of the unit.

The discharge regimes may be adapted to achieve a plurality of results, the following are examples of variants of excitation of the discharge:

The discharge may be on a constant voltage from a rectifier through a ballast resistance The discharge may be from an energy storage device (e.g. Capacitor) charged to the voltage of breakdown The discharge may be from a source of an alternating voltage (e.g., having a frequency of 30-50 kHz). In tested cases, plasma was ignited using pressure (i.e. before the reactor pressure) of 100 atm, and a discharge voltage of 10 KV or above. In stationary regime, the pressure could be lowered to 65 atm or less, and the voltage between the electrodes was between 500 to 4000 V (or above), which depended on the geometry of the chamber. Discharge current was between hundreds of mA to a few A.

The reactor 260 may comprise a plurality of devices for controlling the environment created inside the reactor. For example, the reactor comprises an emergency dump valve, which may be triggered by a set of security sensors such as manometers, thermometer, vacuum meter or any other sensor. The reactor comprises one or more nozzles for adding reagents inside a reactor.

In order to improve the gas/liquid ratio of the biphasic medium, and depending on the application where the disclosed method is utilized, a nozzle, diaphragm or hydrodynamic transducer may be utilized to further enhance the creation of the gas-and-liquid mixture. In embodiments of the invention, several different types of plasma can be produced with minimal changes to the reaction chamber. The latter may be achieved, for example, by modifying the operation parameters of the power supply unit (e.g., block 250).

Block 250 represents one or more power supply systems. A power supply 250 may be used to control the electric discharge, it may also be configure to be controlled by the control system 240 in order to adjust the operations parameters for optimal use of a system embodying the invention.

After passing the reactor 260, the stream flows through a narrowing pipeline 265 into one or more post-treatment system represented by block 270. The pressure level after the reactor may be set using the diameter of the narrowing pipeline.

Block 270 represents one or more post-treatment systems comprising one or more means to condense the biphasic stream in order to transform the liquid stream back into a liquid single-phased stream. A post-treatment system, in accordance with embodiments of the invention, comprises any combination of at least one cooling device, at least one compressing device, at least one condensation device and any other device that may be beneficial to any specific implementation of the invention. In the case where the feedstock contains a combination of two or more substances, or generally the product of the plasma treatment result in a liquid that contains more than one substance, the post-treatment system may comprise several stations. For example, a post-treatment system, in accordance with the invention, may comprise several post-treatment stations for collecting each individual substance separately. The latter may be achieved in the case of substances that possess distinct condensation temperatures by providing multiple condensation stations where each station provides the temperature and/or pressure to allow for the condensation of a target substance or combination thereof.

The products and/or the remaining liquid is/are collected in a sink tank 280. To fully utilize the unused feedstock, tanks 280 and 210 may be connected in a closed loop operation of the system.

The components of a system embodying the invention, as introduced above, may be multiplied and mounted in parallel and/or in a series in order to scale any application to an industrial level. The modularity of the system also allow for one stage to be carried out in one location and liquids and/or gases transported to other locations for use and/or for further treatments.

Means for Generating Biphasic Media and Plasma Particles

For each type of feedstock there is an optimal set of parameters depending on the application. Nevertheless, there is a wide range of parameters combination that results in stable plasma discharge inside a reactor. For pure liquids it is possible to calculate these optimal parameters or estimate them theoretically, for mixtures they should be determined experimentally.

By varying the parameters of the power source of the discharge and reactor characteristics, it is possible to influence the processes of plasma glow within a gas/liquid ratio stream.

Additional ultrasonic equipment may be used in certain applications as it provides possibilities for some other applications, although, it is not indispensable. Moreover, the unit at the inlet, apart from creating the biphasic medium, also has the function of creating ultrasonic waves.

In an embodiment of the invention, a single-phase stream is forced through a nozzle, diaphragm or hydrodynamic transducer from a high-pressure zone to one where the pressure is lower than the vapor pressure of said stream at the local temperature. The single-phase stream is accelerated as liquid. Then, at the expansion zone of the nozzle, diaphragm or hydrodynamic transducer, flashing of the jet stream takes place, as the pressure is lower than the vapor pressure. The flashing phenomenon is an abrupt adiabatic phase change, so it can be seen as a discontinuity in the field, and occurs on the surface of a liquid core that rises from the nozzle through an evaporation wave process.

Downstream of the evaporation discontinuity, a biphasic stream forms, where the continuous phase is gaseous with disperse liquid droplets. This stream reaches very high velocities, over the local sonic speed, yielding a choked flow, meaning that there may not be an increase in the flow rate as the back pressure (i.e. in the chamber) is decreased.

Generally, the speed of a sound wave in a biphasic stream is much lower not only than speed of a sound wave in a liquid (water), but also than speed of a sound wave in a gas (steam).

For example, under normal conditions the speed of sound in water is about 1500 m/s, and the speed of sound in air is about 340 m/s. In a biphasic mixture of air and water, where the ratio of partial volumes is in the range of 0.2 to 0.9, the speed of a sound wave is in the limits of 20 to 100 m/s. The ratio of partial volumes "β" of phases in a mix is given by:

$$\beta = Vg \cdot (Vg + Vw)^{-1}$$

where "Vg" is the volume of gas/air and "Vw" is the volume of water. The minimum value of speed of sound is 20 m/s at volume ratio "β" of 0.5. At deep vacuum, the speed of a sound wave can decrease to a few meters per second.

In embodiments of the invention, the expansion process may then be carried out by means of a shock wave, where the flow pressure abruptly stabilizes with the back pressure, with respect to the desired effects on the fluid.

Figure 3:
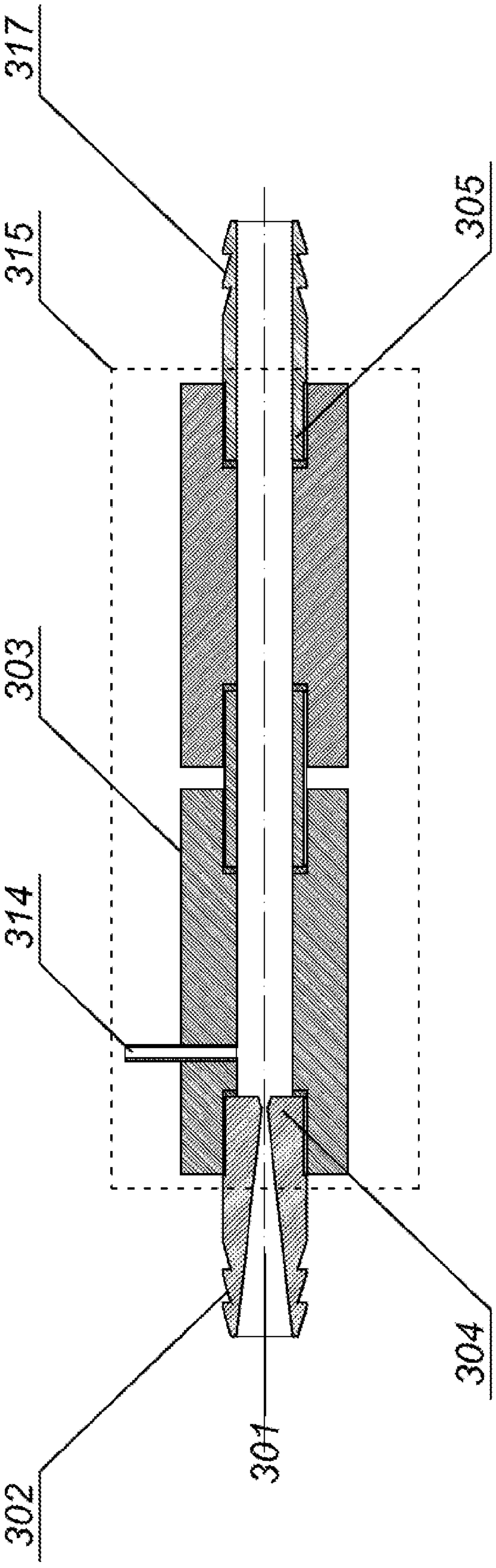
FIG. 3 shows a cut-through representation of a portion of a system for applying plasma to a liquid in accordance with an embodiment of the invention.

FIG. 3 shows a cut-through representation of a portion of a system for applying plasma to a liquid in accordance with an embodiment of the invention. The liquid 301 in the pipeline 302 flows from a zone of high pressure P into a low pressure zone in plasma chamber 303. The transition from high to low pressure transforms the single-phase stream in the pipeline 302 into a biphasic high gas/liquid ratio stream inside plasma chamber 303. Electrodes 304 and 305 are positioned inside plasma chamber 303 according to the needs of the intended application. The electrodes are connected to a source of voltage that provides ignition and maintenance of burning of the stationary plasma discharge. After passing the discharge zone 315, the biphasic stream flows into a narrowing zone of pipeline 317 where it condenses back to a single-phase stream. Valve 314 enables a system to control the pressure inside the chamber.

Figure 4:
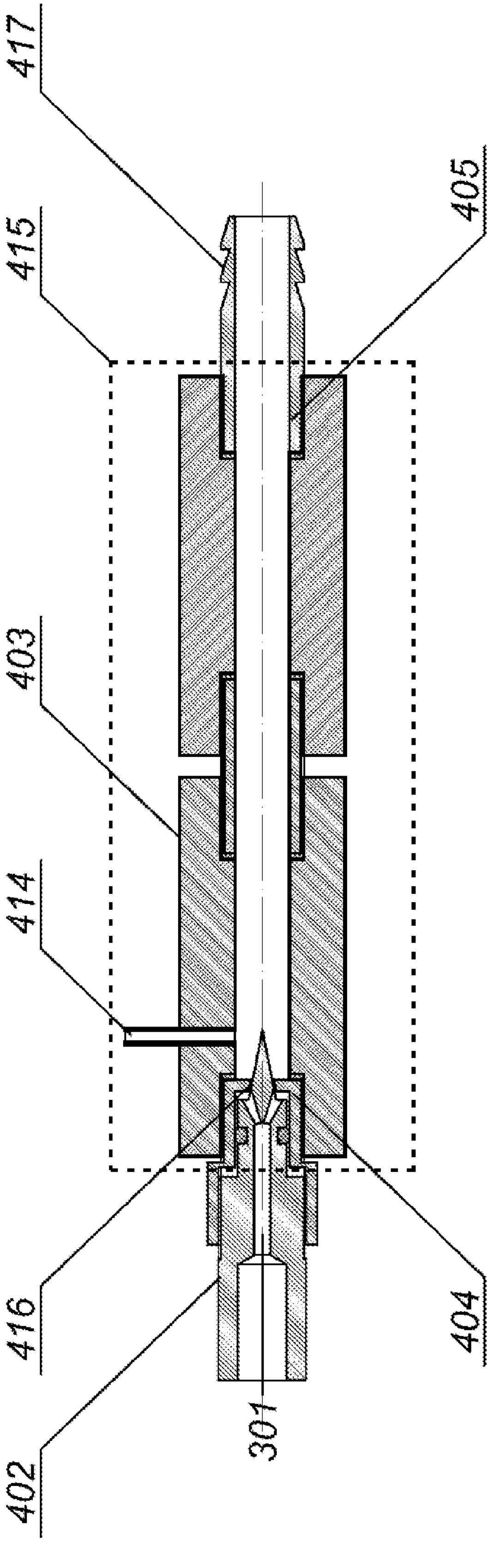
FIG. 4 shows a cut-through representation of a portion of a system for applying plasma to a liquid in accordance with an embodiment of the invention utilizing a hydrodynamic transducer.

FIG. 4 shows a cut-through representation of a portion of a system for applying plasma to a liquid in accordance with an embodiment of the invention utilizing a hydrodynamic transducer. In an embodiment of the invention, the hydrodynamic transducer may be diaphragm 416 and a pipeline 402 zone of bigger diameter that improve the generation of a biphasic stream by increasing the gas/liquid ratio of the stream passing through the diaphragm 416. Electrodes 404 and 405 are positioned inside plasma chamber 403 according to the needs of the specific intended application of the invention. The electrodes are connected to a source of voltage, which provides ignition and maintenance of burning of the stationary plasma discharge. After passing the discharge zone 415, the biphasic stream flows into a narrowing zone of pipeline 417 where it condenses back to a single-phase stream. Valve 414 enables a system to control the pressure inside the chamber.

In applications where the use of metallic electrodes would be undesirable, for instance to avoid the transfer of metallic ions from the metal of the electrodes into the liquid, embodiments of the invention may utilize high-frequency (HF, UHF) and/or a microwave discharge (MW), which further allows for delivering a higher power of discharge without loss of stability.

Figure 5:
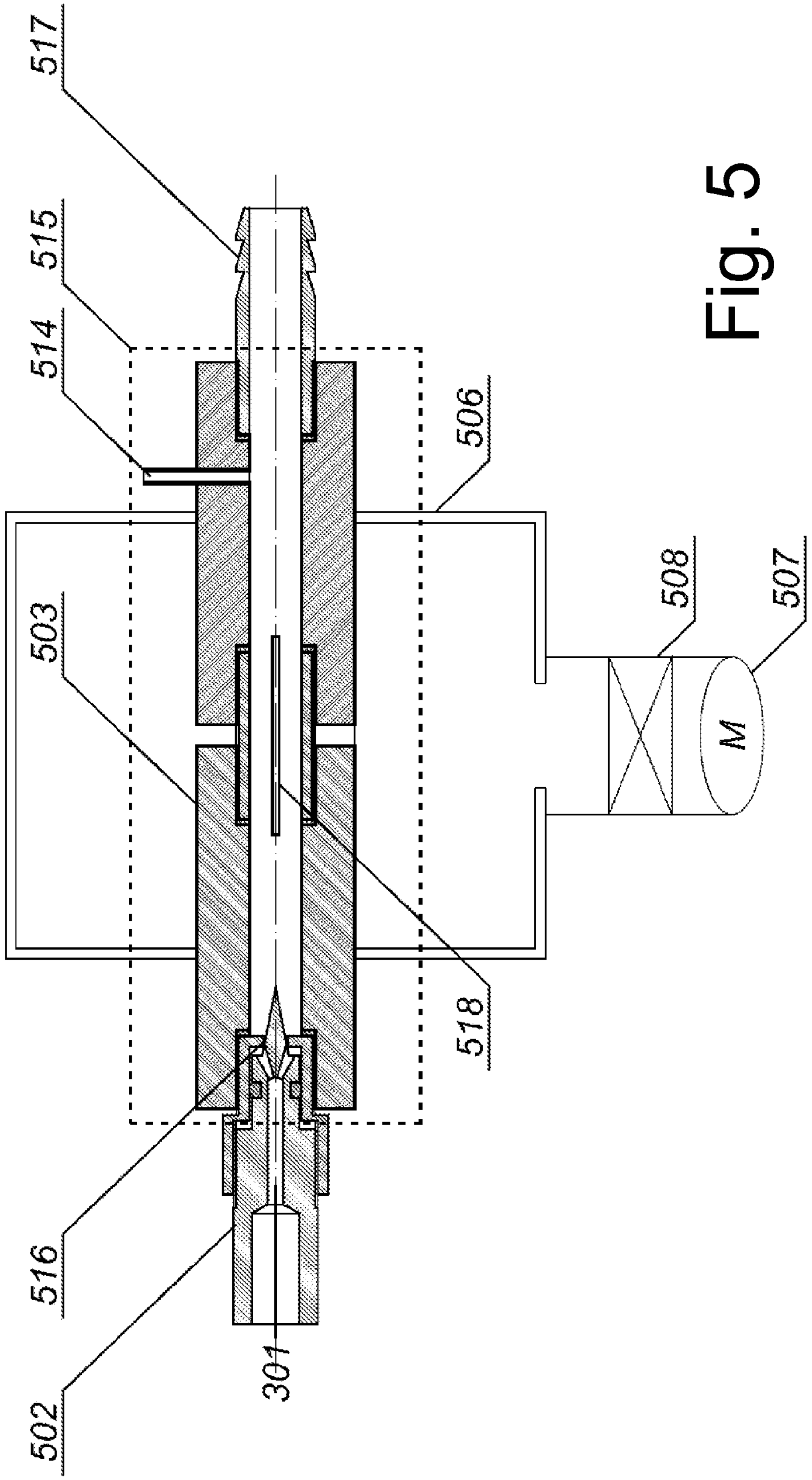
FIG. 5 shows a cut-through representation of a portion of a system for applying plasma to a liquid in accordance with an embodiment of the invention utilizing a microwave power source to generate an electric field.

FIG. 5 shows a cut-through representation of a portion of a system for applying plasma to a liquid in accordance with an embodiment of the invention utilizing a microwave power source to generate an electric field. In the example represented in FIG. 5, a hydrodynamic transducer 516 may be utilized and a pipeline 502 zone of bigger diameter. The discharge zone 515 is radiated by a wave transducer 506, connected to a source of microwave power 507. As a source of microwave power, it is possible to use, for example, a magnetron connected through a ferrite valve 508. FIG. 5 further shows a hydrodynamic radiator 518 in the form of a membrane, placed inside the reaction chamber 503 to further promote the homogenization of the biphasic stream. After passing the discharge zone 515, the biphasic stream flows into a narrowing zone of pipeline 517 where it condenses to a single-phase stream. Valve 514 enables a system to control the pressure inside the chamber.

The invention provides the basic methods and apparatus to carry out a plurality of applications, each of which may be designed to reach a specific goal. The goals of applying plasma particles to a liquid are numerous, and each specific application may be designed to produce a chemical reaction leading to breakdown of one or more substances. In other embodiments the goal may be the synthesis of new products starting from initial products present in the feedstock. Yet, in other embodiments the goal may be a combination of both breakdown of one set of compounds while synthesizing other products. One with ordinary skills in one or more areas of expertise such as plasma physics, engineering, chemistry and biochemistry would recognize that by providing the means to generate plasma in a highly controllable environment surrounding a liquid, the invention opens the way to numerous applications whose goal may be to breakdown some substances, for example, in order to remove toxins from waste water, the synthesis of molecules such as the formation of molecular hydrogen or a combination of both.

Method and Apparatus for Sanitizing Water

The invention provides a method and system for disinfecting water. The conditions created inside the reactor in the presence of plasma (see above description) in combination with the application of plasma to a liquid, following the invention's teachings, provide a suitable environment for ridding water of biological agents that may pose a danger to a consumer.

Figure 6:
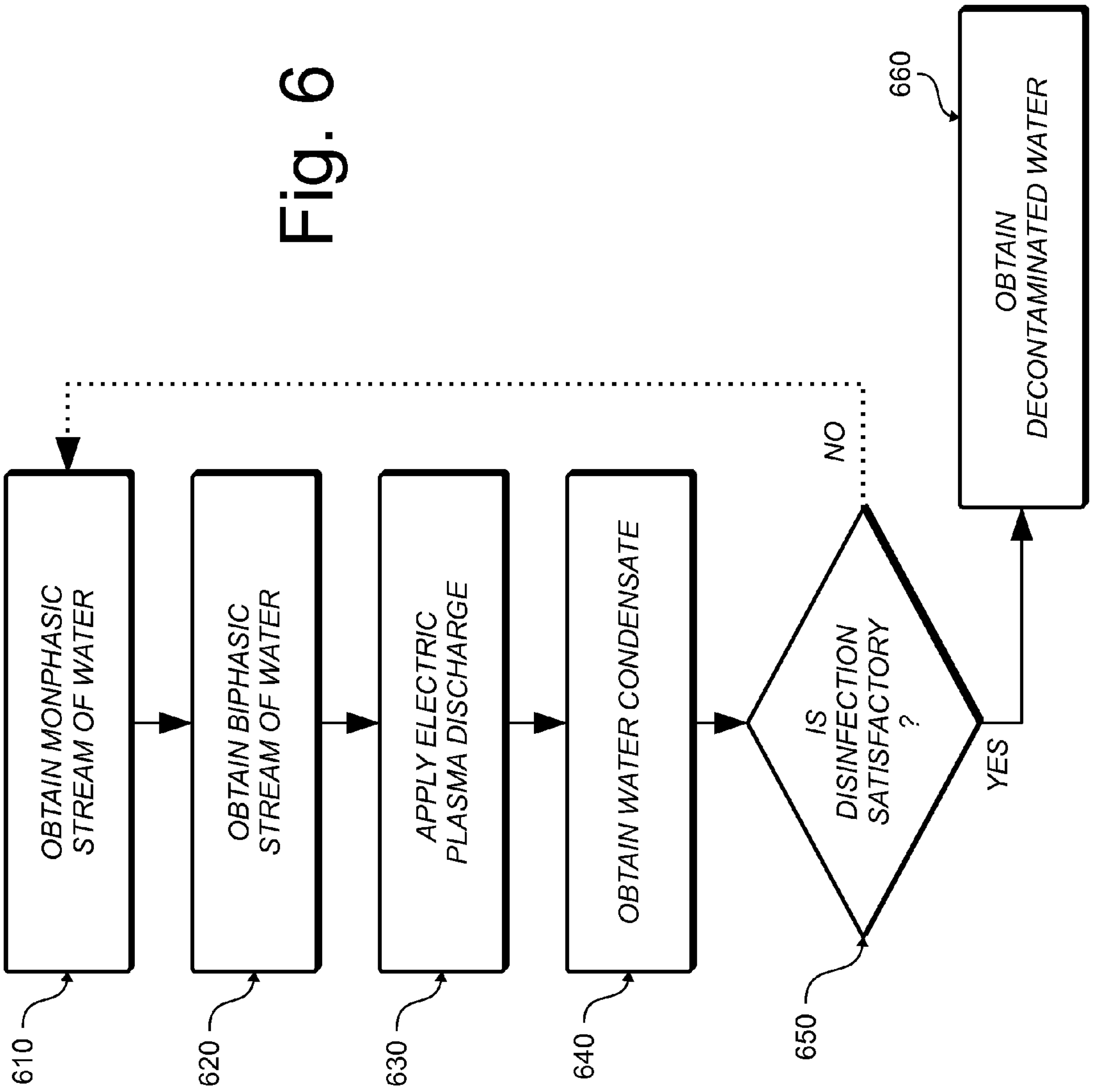
FIG. 6 is a flowchart diagram representing steps of disinfecting water in accordance with an embodiment of the invention.

FIG. 6 is a flowchart diagram representing steps of disinfecting water in accordance with an embodiment of the invention. At step 610, a water supply potentially containing harmful biological agents is brought to a disinfection system embodying the invention. Step 610 may involve other steps of pretreatment comprising filtering, decanting, mixing with chemicals and/or any other step of pretreatment.

At step 620, the water is injected into a reactor (as described above) to create a biphasic mixture containing liquid droplets suspended in gas. The reactor comprises a pair of electrodes that are used to trigger plasma inside the reaction chamber. At step 630, plasma is created, for example, by passing a high voltage electric current through the electrodes.

Multiple water disinfecting factors accompany the creation of plasma. Among the disinfecting factors are: ultraviolet radiation (UV), infrared radiation (IR), ozone and the shock of ultrasonic vibrations. For instance, using the parameters specified above (200 to 2000 volt/cm), UV with wavelength about 320 nm and IR with wavelength 840 nm are generated in the plasma chamber.

Table 1, below, lists a summary of disinfectants produced in the presence of plasma, and the expected effects of the application of disinfectants on biological agents in the water.

TABLE 1

Factors present in the reaction chamber in the presence of plasma and their disinfecting effects on biological agents.

| Disinfectant | Effect | Disinfection Result |
|---|---|---|
| U.V. Radiation | Disrupting DNA and Blocking protein synthesis | disrupting microorganism reproduction killing microorganisms through blocking expression of proteins |
| I.R Radiation | Raising temperature | killing microorganisms through coagulation of proteins (e.g., enzymes) enhancing the efficiency of other disinfectants |
| U.S. Vibrations | Mechanical shearing | Mechanical destruction of microorganisms |
| Ozone | Oxidation | Breaking cell wall of microorganisms affecting nucleic acids of microorganisms |

Due to the proximity of plasma to the biological agents contained in the liquid phase provided by the invention, several agents that are known to have disinfecting effects are generated directly in the medium in the maximal closeness to biological contaminants.

Rigid UV light (with short wavelength) is most effective for destruction of biological agents. As the pressure of the electric field increases (i.e. its shift to the top border of the range of pressure specified above (200 to 2000 volt/cm)) the wave length of UV of 200 nanometers and lower tends to steadily decrease. In the latter case, a high concentration of ozone is generated in the plasma chamber.

Ultrasound (US) with frequency 15 to 40 kHz is able to deactivate biological agents. In this case, initial water moves through a hydrodynamic transducer into the plasma chamber. The hydrodynamic transducer may be preliminary adjusted to the above range of frequencies and may also play a function of an entrance nozzle to the plasma chamber.

Embodiments of the invention utilize electrodes made from such metals as silver or titanium, which may increase the antibacterial properties of the treatment. The introduction of rod-like electrodes in a discharge zone results in a saturation of water by ozone. Due to its highly oxidizing properties and effect on the biochemistry of biological agent, ozone is extremely effective for the inactivation of bacteria and many kinds of microbes.

At large amounts of electric current of the discharge, intense radiation in a wide range of wave-lengths from ultraviolet to infra-red is observed. The latter promotes the formation of chemically active particles in plasma and in a liquid. By varying acoustic and electric parameters, it is possible to control the wavelength of the emitted radiation, thus generating a wide spectrum of ultraviolet radiation located at 300 to 600 nanometers in the radiation spectrum. The latter also favors water sanitization, since ultraviolet penetrates an organism cell wall disrupting its genetic material.

The hydrodynamic transducer generates an ultrasonic field in the medium, which provides an accelerated mass transfer of the plasma discharge products (ozone, atomic oxygen, oxygen ions and other oxidizers) to the microorganisms and pollutants. This way, the plasma discharge products affect the microorganisms and pollutants in a short amount of time and the sanitization is efficient.

A reactor in accordance with the invention, may in addition to producing each of the disinfecting agents (e.g., ozone, ultraviolet and ultrasonic waves etc.) alone, also produce two or more of the latter agents simultaneously. A combination of two or more of these agents is even more effective at sanitizing water, since the effects are cumulative.

Ultraviolet (UV) light is the spectrum of electromagnetic radiation within the scope of 10 nm to 400 nm. The possibilities of using UV light for water disinfection have been known for several decades. UV light penetrates the cell body disrupts Deoxyribonucleic Acid (DNA) and Ribonucleic Acid (RNA), which support the storage and expression of all genetic information in an organism, thus preventing reproduction or killing the cells. UV treatment does not after water chemically. Nothing is being added except energy. Under ideal conditions, UV treatment can provide greater than 99% reduction of all bacteria.

Ozone is produced when oxygen ($O_2$) molecules are dissociated by an energy source into oxygen atoms and subsequently collide with an oxygen molecule to form an unstable gas, ozone ($O_3$), which is used to disinfect water. Ozone is generated onsite because it is unstable and decomposes to elemental oxygen in a short amount of time after generation; it is very strong oxidant and bactericide. The mechanisms of disinfection using ozone include:

Direct oxidation/destruction of the cell wall with leakage of cellular constituents outside of the cell.

Reactions with radical by-products of ozone decomposition.

Damage to the constituents of the nucleic acids (purines and pyrimidines).

When ozone decomposes in water, free radicals, such as hydroperoxyl ($HO_2$) and hydroxyl (OH) are formed and have great oxidizing capacity, which play an active role in the disinfection process. It is generally believed that the bacteria are destroyed because of protoplasmic oxidation resulting in cell wall disintegration.

Main advantages of ozone disinfection are that Ozone is more effective than chlorine in destroying viruses and bacteria, there are no harmful residuals that need to be removed after ozonation because ozone decomposes rapidly. After ozonation, there is no regrowth of microorganisms, except for those protected by the particulates in the waste water stream.

Infrared radiation (IR), such as lasers, may be used to sterilize bacterial spores on metal substrates. For example, Baca (U.S. Pat. No. 6,740,244 B2) discloses a near-point near-infrared laser water treatment apparatus for use in dental hand-pieces was disclosed.

In embodiments of the invention, IR sanitization is accomplished thermally by the plasma discharge that irradiates the water stream with infrared rays containing far-infrared rays, thereby rapidly heating the object's surface to be sanitized to lethal temperatures for bacteria.

S. Gribin, V. Assaoul and B. Spesivtsev in "Application of Laser Induced Micro-Blasts for Liquid Disinfection" (Modelling and Simulation Society of Australia and New Zealand Conference, 1997) shows that microorganisms can survive in conditions of steady pressure up to 100 MPa. Nevertheless in pulsating pressure this value drops dramatically. For example, with a frequency of 50 Hz, and amplitude of 7 MPa for 5 to 10 seconds has an important bactericidal effect. Size in space of a shock wave is around 1 to 30 mm, which is over 1000 times bigger than a character sized microorganism, meaning that mechanical destruction of bacteria is possible. There is a value of minimum pressure amplitude ($\Delta P$) required to affect microorganisms, which is characteristic to each one of them and is determined experimentally.

At step 640, the biphasic stream is brought back to a water solution, as described above. A test for the effectiveness of the treatment may be conducted at step 650. If the water is found to have been disinfected to a satisfactory level, the water is then piped out of the system (e.g., disinfection station) at step 660, otherwise the water may optionally be pumped back into the reactor for further treatment.

Experiments showed that following a discharge of electric current of 150 mA to 5 A, the growth of microbes completely stopped, as well as water was effectively disinfected from some types of viruses. Power density is, thus, around 8 kJ/kg. Test experiments with water solutions of *Escherichia coli* (*E. coli*) and *Micrococcus luteus* have been carried out. The increase in the current of the discharge up to 5 A led to the termination of growth of bacteria after single passage of a solution through a discharge zone. The made crops have shown authentic reduction of colonies-forming of units after 5 minutes of influence that corresponds to direct microscopic observations. After 10 minutes of treatment, no *Escherichia coli* was found in samples. Then, after 15 minutes and *Micrococcus luteus* was also eliminated. The treated water, in the latter case, remained germ free for at least 10 days stored at room temperature. The increase of current of the discharge up to 5 A led to the termination of growth of bacteria after single passage of a solution through a discharge zone.

Figure 7:
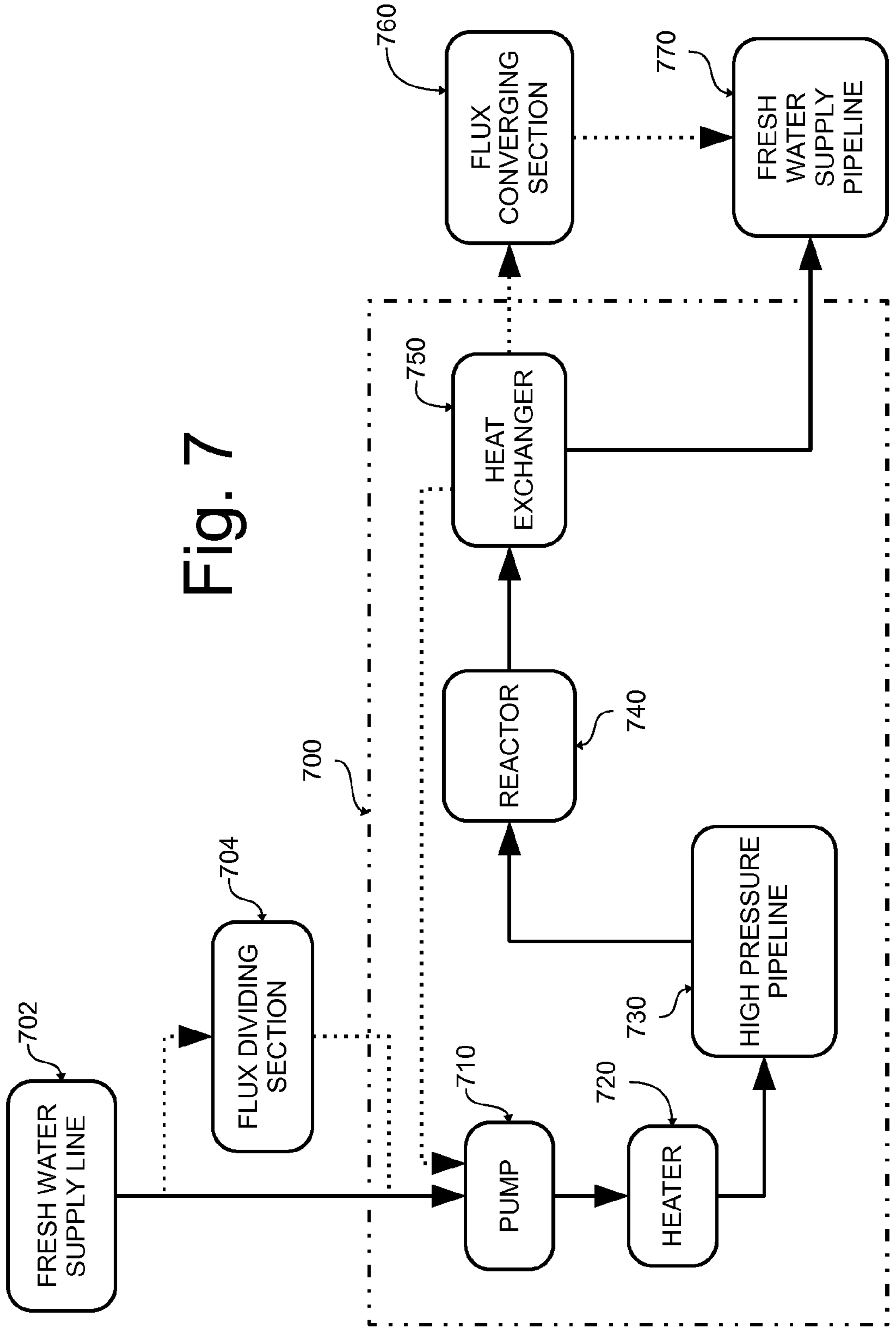
FIG. 7 is a block diagram representing components of a system embodying the invention to provide water sanitization.

FIG. 7 is a block diagram representing components of a system embodying the invention to provide water sanitization. Block 702 represents a source of fresh water that is potentially (or known to be) contaminated with biological agents. Such a source may be part of a grid of distribution of water the sterility of which may have been compromised (e.g., as a result of a terrorist attack), or a natural water source (e.g., a well, lake or river) whose water may be suspected of being contaminated with germs and unsuitable for consumption.

A system embodying the invention may be utilized to treat water that is distributed by a grid and/or in a stand alone manner. For example, an apparatus embodying the invention may be portable and self-reliant for energy (see below) and is capable of working in a remote location to provide consumable water. Furthermore, a system for sanitizing water may utilize a plurality of apparatuses embodying the invention to increase capacity of water treatment. Block 704 represents a system of dividing the flux of a water from a main source of water to supply a plurality of apparatuses embodying the invention.

Block 700 represents a set of components of an apparatus embodying the invention that carries out the method steps described in FIG. 6. The apparatus may include one or more pumps (e.g., block 710) for transferring water from a source. The apparatus may include one or more heaters 720 for heating water before the injection of the water into the reactor. The apparatus may include one or more high-pressure pipeline 730. As described above, in addition to various devices high-pressure contributes to the transformation of the water stream from liquid only to a mixture comprising liquid and gas.

Block 740 represents a reactor where plasma is created and the disinfecting agents produced by plasma come in contact with the drops of water that contain the biological agents. As described above, one or more factors inside the reaction chamber may be produced by the creation of plasma. An apparatus embodying the invention may include one or more heat exchangers (e.g., block 750). A heat exchanger may be utilized to bring the temperature of the water to the level used for delivery to later stage of the water supply system. Once the water has been reverted back to single—liquid—phase, the water may be checked for disinfection efficiency. Water (or a portion thereof) that has been submitted to a plasma treatment may be returned in a closed loop to the reactor in order to further sanitize it. For example, a closed loop circuit may be designed between any of the system's components downstream from the reactor with any of the components upstream of the reactor.

In cases where a multiplicity of apparatuses embodying the invention are connected to a system of water distribution, for example, for providing redundancy and/or multiplying the treatment capacity, the water from the apparatuses maybe streamed through one or more flux converging means, represented by block 760, which collects the treated water and streams the water to the water distribution network, as represented by block 770. Block 770 alternatively one or more water storage and distribution means (e.g., tanks and reservoirs).

Figure 8:
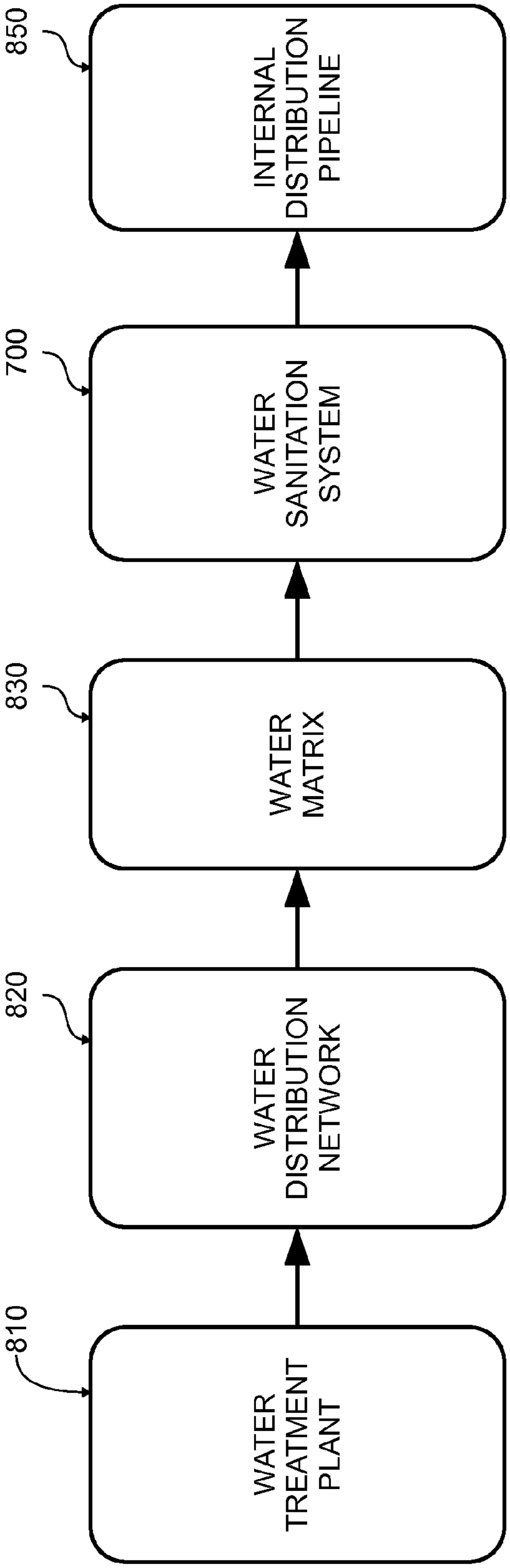
FIG. 8 is a block diagram representing a system for using an embodiment of the invention at a local level where the water source is a large distribution network and an apparatus embodying the invention is utilized in proximity of the consumer.

FIG. 8 is a block diagram representing a system for using an embodiment of the invention at a local level where the water source is a large distribution network and an apparatus embodying the invention is utilized in proximity of the consumer. One of the advantages of the apparatus of the invention is its versatility and adaptability that allow a user to install an apparatus at many locations for convenience, and install multiple units to increase capacity and/or provide redundancy.

A typical example the representation of FIG. 8 may serve is when water treatment is desired or required at a local level (e.g., multiple-dwelling buildings or single houses). In the latter case, one or more apparatuses may be installed in each location at the latest stage of the water distribution.

Block 810 represents the main water supply source, such as city's water treatment plant. Block 820 represents the water distribution system. Both stages may be a location, for example, of a terrorist attack using bio-active agents that make the water unsuitable for consumption. Furthermore, because once biological agents are in the water, they can reproduce and become hard to remove from the storage and distribution systems.

Block 830 represents the water matrix that supplies water to buildings, for example. An apparatus embodying the invention, as represented by block 700, may be installed between the main water supply to the building and the distribution network within the building. Block 850 represents a water distribution network. The latter may be the last water connection that links a water disinfection station from the consumer in a building.

Figure 9:
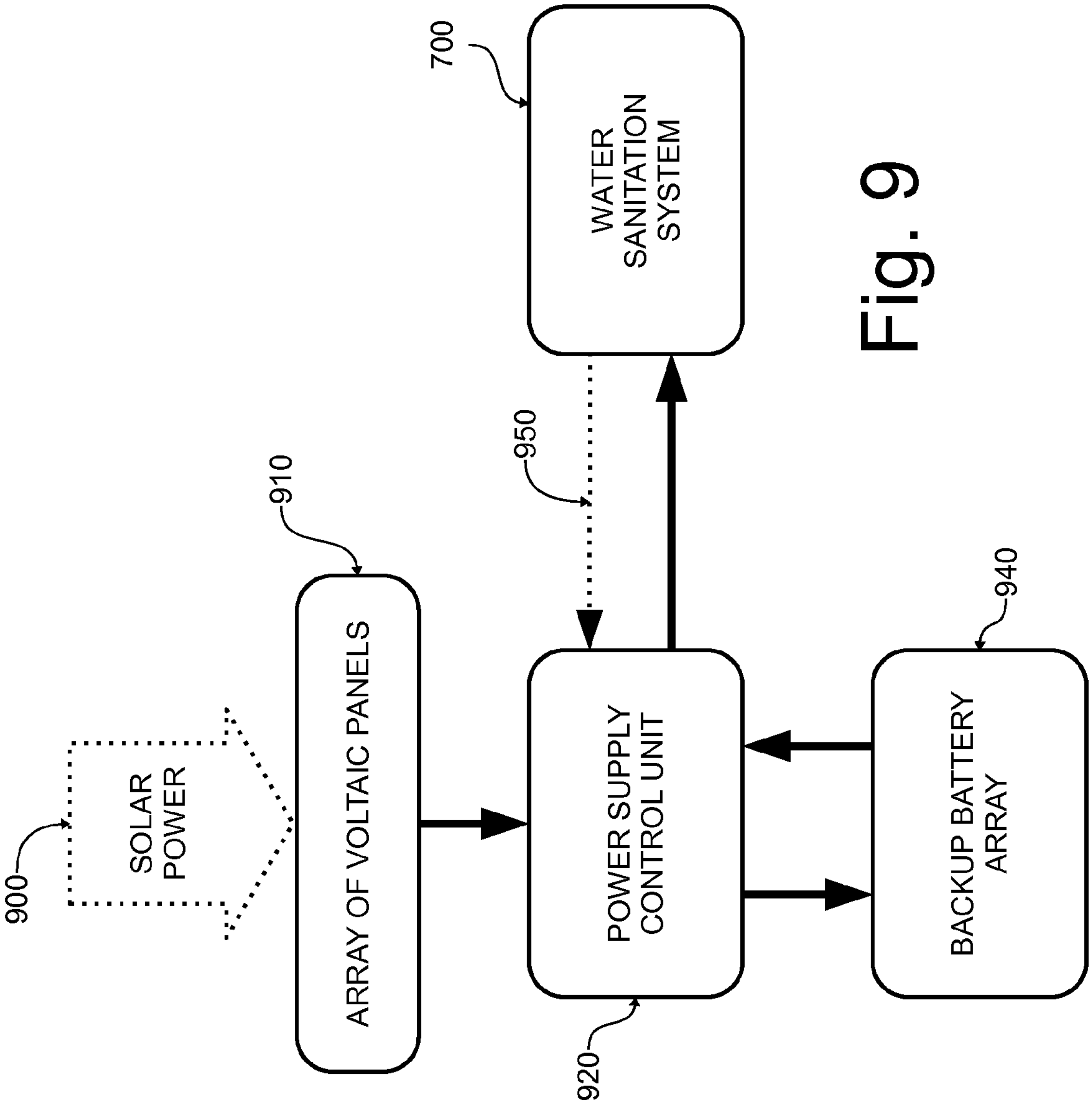
FIG. 9 is a block diagram representing components of a system implementing the invention that relies on solar energy to provide water sanitation.

FIG. 9 is a block diagram representing components of a system implementing the invention that relies on solar energy to provide water sanitation. The latter system may be powered by an array of photovoltaic panels (e.g., 910) that capture light (e.g., as represented by block 900) and convert light into electric power. The system may include a set of backup batteries (e.g., as represented by block 940) for operation while sun light is unavailable. The system may utilize photovoltaic panels (e.g. KYOCERA Panels KD 210GH-2PH, 16% efficiency) to capture the energy from the sun and transform it into electric power.

Block 920 represents a power supply and control unit that manages power supply to the water disinfection apparatus 700, manages storing power in the battery set 940, and recovering back electric power from the battery set, when needed, to power the water sanitization apparatus. The electric power is used to power up the system and simultaneously to charge the battery array (e.g. AGM Deep Cycle, 24V 480 Ah). The power supply and control unit is enabled with electronic circuits that provide the capabilities for managing water treatment, electric power supply, power storage and power recovery from the batteries. The power supply and control unit may receive a plurality of information data (e.g., 950) in order to accurately determine optimal parameters of operation. For example, the throughput of the system may depend of the flux of water usage, water reserve or any other parameter that serves to maximize the system's performance (e.g., lowering energy requirement).

An embodiment of the invention may be designed to serve humanitarian missions. For example, in remote location where electricity is unavailable, and water sources may be contaminated, the system may be able to provide drinkable water to a community. The latter system should have other capabilities in addition to the main function of disinfecting water: it should be able to endure a heavy duty operation regime, extreme climatic conditions (e.g. high temperatures and humidity, monsoon seasons, among others), stand alone and unattended continuous operation, among others. As an example the previously described embodiment along with a 30 $m^2$ photovoltaic panel array could provide 6000 liter per day of sanitized potable water, which could fulfill the needs of a 3000 person community.

Thus a method, system and apparatus for permitting application of plasma particles to a liquid providing means to conduct a plurality of application, such as water sanitization.

What is claimed is:

1. A method of applying plasma particles to a liquid comprising the steps of:

passing an input stream of liquid into a chamber through a nozzle that atomizes said liquid, wherein the pressure of said liquid before said nozzle is in the range of 1 to 100 atm, wherein the pressure inside said chamber is lower than the vapor pressure of said liquid, wherein said pressure inside said chamber is in the range of 0.1 atm to 0.8 atm;

obtaining within said chamber a biphasic mixture having a gas portion formed by adiabatic evaporation of a portion of said liquid and having droplets of said liquid suspended within said gas portion;

igniting a plasma state in said gas portion of said biphasic mixture within said chamber by applying an electric field the voltage of which exceeds the threshold of breakdown voltage of the biphasic medium, wherein said electric field is generated by applying an electric current of at least 10,000 Volts to a set of electrodes positioned within said biphasic mixture;

sustaining said plasma state in said mixture by applying an electric current having a voltage of between 500 Volts and 4,000 Volts; and condensing said biphasic mixture following said igniting and said sustaining said plasma state to obtain an output stream of liquid, wherein the pressure of liquid in said output stream after said chamber is in the range of 0.5 atm to 4 atm.

2. The method of claim 1, wherein said step of passing said input stream of liquid, further comprising passing a stream of a water solution containing biological agents.

3. The method of claim 1, wherein said step of passing said input stream of liquid, further comprising compressing said input stream of liquid.

4. The method of claim 1, wherein said step of obtaining said output stream of liquid, further comprising cooling said output stream.

5. A method for sanitizing water comprising the steps of:

obtaining a biphasic stream of a water, comprising feeding said water at the ingress of a reactor through an atomizer, wherein said biphasic stream having droplets of said water suspended within the water vapor formed by adiabatic evaporation of a portion of said water, wherein said reactor having means inside it for applying an electric field;

igniting a plasma state in said biphasic stream inside said reactor by applying an electric discharge of at least 10,000 Volts to said biphasic stream through said means for applying said electric field;

sustaining said plasma state in said biphasic stream by applying an electric current having a voltage of between 500 Volts and 4,000 Volts; and condensing said biphasic stream of said water into a liquid phase at the egress of said reactor.

* * * * *